(12) United States Patent
Soloveichik et al.

(10) Patent No.: US 7,381,390 B2
(45) Date of Patent: Jun. 3, 2008

(54) METHOD FOR MANUFACTURING MAGNESIUM BOROHYDRIDE

(75) Inventors: Grigorii Lev Soloveichik, Latham, NY (US); Ji-Cheng Zhao, Latham, NY (US)

(73) Assignee: General Electric Company, Niskayuna, NY (US)

( * ) Notice: Subject to any disclaimer, the term of this patent is extended or adjusted under 35 U.S.C. 154(b) by 204 days.

(21) Appl. No.: 11/305,914

(22) Filed: Dec. 19, 2005

(65) Prior Publication Data

US 2007/0140944 A1 Jun. 21, 2007

(51) Int. Cl.
*C01B 6/21* (2006.01)
(52) U.S. Cl. ...................................... 423/287
(58) Field of Classification Search ................. 423/287
See application file for complete search history.

(56) References Cited

U.S. PATENT DOCUMENTS

| | | | | |
|---|---|---|---|---|
| 2,784,053 A | * | 3/1957 | Cunningham et al. | 423/286 |
| 2,852,335 A | | 9/1958 | Nigon | |
| 2,930,674 A | | 3/1960 | Heying | |
| 2,930,675 A | | 3/1960 | Batha | |
| 3,063,791 A | * | 11/1962 | Kollonitsch et al. | 423/287 |
| 3,111,372 A | | 11/1963 | Köster et al. | |
| 3,113,832 A | * | 12/1963 | Kollonitsch et al. | 423/287 |
| 3,348,928 A | * | 10/1967 | Kellom et al. | 423/287 |
| 2004/0065395 A1 | | 4/2004 | Desgardin et al. | |
| 2004/0065865 A1 | | 4/2004 | Desgardin et al. | |
| 2004/0249215 A1 | | 12/2004 | Suda et al. | |
| 2005/0207959 A1 | | 9/2005 | Zhou | |

FOREIGN PATENT DOCUMENTS

EP 1 424 310 A2 6/2004
GB 864617 3/1957

OTHER PUBLICATIONS

JP2002173306 Publication Date Jun. 21, 2002. "Method of manufacturing metal hydrogen complex compound". (Abstract Only).
JP2004010446 Publication Date Jan. 15, 2004. "method for producing alkali metal boron hydride". (Abstract Only).
L.V. Titov, et al. "Synthesis and Thermal Decomposition of Magnesium, Calcium, and St ontium Octahydrotriborates Solvated with Diglyme", Russian Journal of Inorganic Chemistry, 29 (3), 1984. Received 27th Sep. 1982. pp. 386-389.

(Continued)

*Primary Examiner*—Wayne A. Langel
(74) *Attorney, Agent, or Firm*—Francis T. Coppa; Patrick K. Patnode

(57) ABSTRACT

Disclosed herein is a method comprising reacting a metal borohydride with a metal chloride composition that comprises magnesium chloride in a solvent to form a reaction mixture; wherein either the metal borohydride, the metal chloride composition or both the metal borohydride and the metal chloride composition are soluble in the solvent and a formed metal chloride is insoluble in the solvent; removing the solvent from the reaction mixture to produce a borohydride complex; treating the borohydride complex to obtain magnesium borohydride; extracting magnesium borohydride solvate; and desolvating the magnesium borohydride solvate to form magnesium borohydride.

17 Claims, 3 Drawing Sheets

OTHER PUBLICATIONS

V.N. Konoplev "Synthesis of Magnesium Tetrahydridoborate", Russian Journal of Inorganic Chemistry, 25 (7), 1980. Received Jan. 22, 1978. pp. 964-966.

D.S. Stasinevich, et al. "Thermochemistry and Thermodynamics of the High-temperature Formation of Alkali-metal Tetrahydroborates" Russian Journal of Physical Chemistry, 50 (12), 1976. Received Oct. 16, 1974. pp. 1847-1848.

Richard Bauer "Magnesium-alkyl-boro-hydrogen and its reactive behavior II[1]" Research institute of Eltro GmbH & Contract/Order, Heidelberg [Mitt. Z. Naturforschg. 16b, 839-847 [1961]; submitted on Jul. 28, 1961] 4 Pages.

Mathias Bremer, et al. "Metal Tetrahydroborates and Tetrahydroborato Metalates. 30 [1] Solvates of Alcoholato-, Phenolato-, and Bis(trimethylsilyl) amido-Magnesium Tetrahydroborates $XMgBH_4(L_n)$" Z. Anorg. Allg. Chem. 2005, 631. pp. 683-697.

Liang Shi, et al. "Synthesis of ultrafine superconducting $MgB_2$ by a convenient solid-state reaction route" Elsevier B.V., Physica C 405 (2004) Received Dec. 22, 2003. pp. 271-274.

Mathias Bremer, et al. "The Structure of Some Amine Solvates of Magnesium Bis (tetrahydroborate) and DFT Calculations on Solvates of Lithium Tetrahydroborate" European Journal of Inorganic Chemistry 2003, Received May 28, 2002. pp. 111-119.

Heinrich Nöth, et al. "Structure and Reactions of Tetrahydroborates: New Results with a Fascinating Ligand" Current Topics in the Chemistry of Boron (1994); 6 pages.

Rosanna Bonaccorsi, et al. "Nonempirical Study of the Structure and Stability of Beryllium, Magnesium, and Calcium Borohydrides" Inorganic Chemistry, vol. 30, No. 15. 1991. Received Feb. 7, 1990. pp. 2964-2969.

Heinrich Nöth "Metal Tetrahydridoborates and Tetrahydridoborates Metal plates 11[1] For Crystal and Molecule structure of Magnesium Tetrahydridoborate Mg (BH4) 2.3 THF" Z. Nature research. 37b, 14991503 (1982); Received on Aug. 17, 1982. 6 Pages.

K. N. Semenenko, et al. "On the interaction of magnesium chloride with alkaline metals aluminum hydride and lithium boron hydride" Bulletin Of The Moscow University, No. 2—1974. Received Mar. 23, 1973. pp. 185-187.

V.N. Konoplev, et al. "Equilibrium Diagram of the Magnesium Tetrahydroborate-Diethyl Ether System" Russian Journal of Inorganic Chemistry, 17 (8), Apr. 1972. Received Apr. 12, 1972 pp. 1211-1212.

J. Plešek, et al. "Chemistry Of Boranes. IV. On Preparation, Properties, And Behavior Towards Lewis Bases Of Magnesium Borohydride" Collection Czechoslov. Chem. Commun. vol. 31. Received May 25, 1965. pp. 3845-3858.

S. Hermanek, et al. "Chemistry Of Boron Hydrides I. Preparation Of Magnesiumoctahydrotriborates" Collection of Czech. Chem. Commn., vol. 31, Received on Aug. 13, 1963, 16 pages.

Richard Bauer "For knowledge of Magnesium Boranate production" Research institute of Eltro GmbH & Co, Heidelbeg [ Z. Naturforschg. 17b, [1962]; submitted on Mar. 1, 1962]; 2 pages.

Janos Kollonitsch, et al. "New and Known Complex Borohydrides and some of their Applications in Organic Syntheses" Nature (London, United Kingdom), vol. 173. Jan. 16, 1954. pp. 125-126.

V.N. Konoplev, et al. "Solubility Isotherm Of Magnesium Tetrahydroborate And Sodium Tetrahydroborate in $NN$-Dimethyl-Formamide at $0°$" Russian Journal of Inorganic Chemistry, Oct. 1965, Received Jan. 27, 1965. pp. 1283-1284.

V.I. Mikheeva, et al. "The Reaction Of Sodium Tetrahydro-Borate with Anhydrous Magnesium Chloride In $NN$-Dimethylformamide" Russian Journal Of Inorganic Chemistry, Received Sep. 17, 1964. pp. 1148-1151.

* cited by examiner

METHOD FOR MANUFACTURING MAGNESIUM BOROHYDRIDE

BACKGROUND

This disclosure is related to methods for the manufacturing of magnesium borohydride.

Hydrogen is a "clean fuel" because it can be reacted with oxygen in hydrogen-consuming devices, such as a fuel cell or a combustion engine, to produce energy and water. Virtually no other reaction byproducts are produced in the exhaust. As a result, the use of hydrogen as a fuel effectively solves many environmental problems associated with the use of petroleum based fuels. Safe and efficient storage of hydrogen gas is, however, essential for many applications that can use hydrogen. In particular, minimizing volume and weight of the hydrogen storage systems are important factors in mobile applications.

Several methods of storing hydrogen are currently used but these are either inadequate or impractical for widespread mobile consumer applications. For example, hydrogen can be stored in liquid form at very low temperatures. However, the energy consumed in liquefying hydrogen gas is about 30% of the energy available from the resulting hydrogen. In addition, a standard tank filled with liquid hydrogen will become empty in about a week through evaporation; thus dormancy is also a problem. These factors make liquid hydrogen impractical for most consumer applications.

An alternative is to store hydrogen under high pressure in cylinders. However, a 100 pound steel cylinder can only store about one pound of hydrogen at about 2200 psi, which translates into 1% by weight of hydrogen storage. More expensive composite cylinders with special compressors can store hydrogen at higher pressures of about 4,500 psi to achieve a more favorable storage ratio of about 4% by weight. Although even higher pressures are possible, safety factors and the high amount of energy consumed in achieving such high pressures have compelled a search for alternative hydrogen storage technologies that are both safe and efficient. In view of the above, there is a need for safer, more effective methods of storing and recovering hydrogen.

Magnesium borohydride [$Mg(BH_4)_2$] is a promising material for hydrogen storage and recovery. It comprises up to about 14.8 weight percent (wt %) of hydrogen that can be liberated upon heating. The use of magnesium borohydride is limited by the absence of convenient methods for its manufacture. It is therefore desirable to have a convenient method for manufacturing magnesium borohydride.

SUMMARY

Disclosed herein is a method comprising reacting a metal borohydride with a metal chloride composition that comprises magnesium chloride in a solvent to form a reaction mixture; wherein either the metal borohydride, the metal chloride composition or both the metal borohydride and the metal chloride composition are soluble in the solvent and a formed metal chloride is insoluble in the solvent; removing the solvent from the reaction mixture to produce a borohydride complex; treating the borohydride complex to obtain magnesium borohydride; extracting magnesium borohydride solvate; and desolvating the magnesium borohydride solvate to form magnesium borohydride.

DETAILED DESCRIPTION

Figure 1:
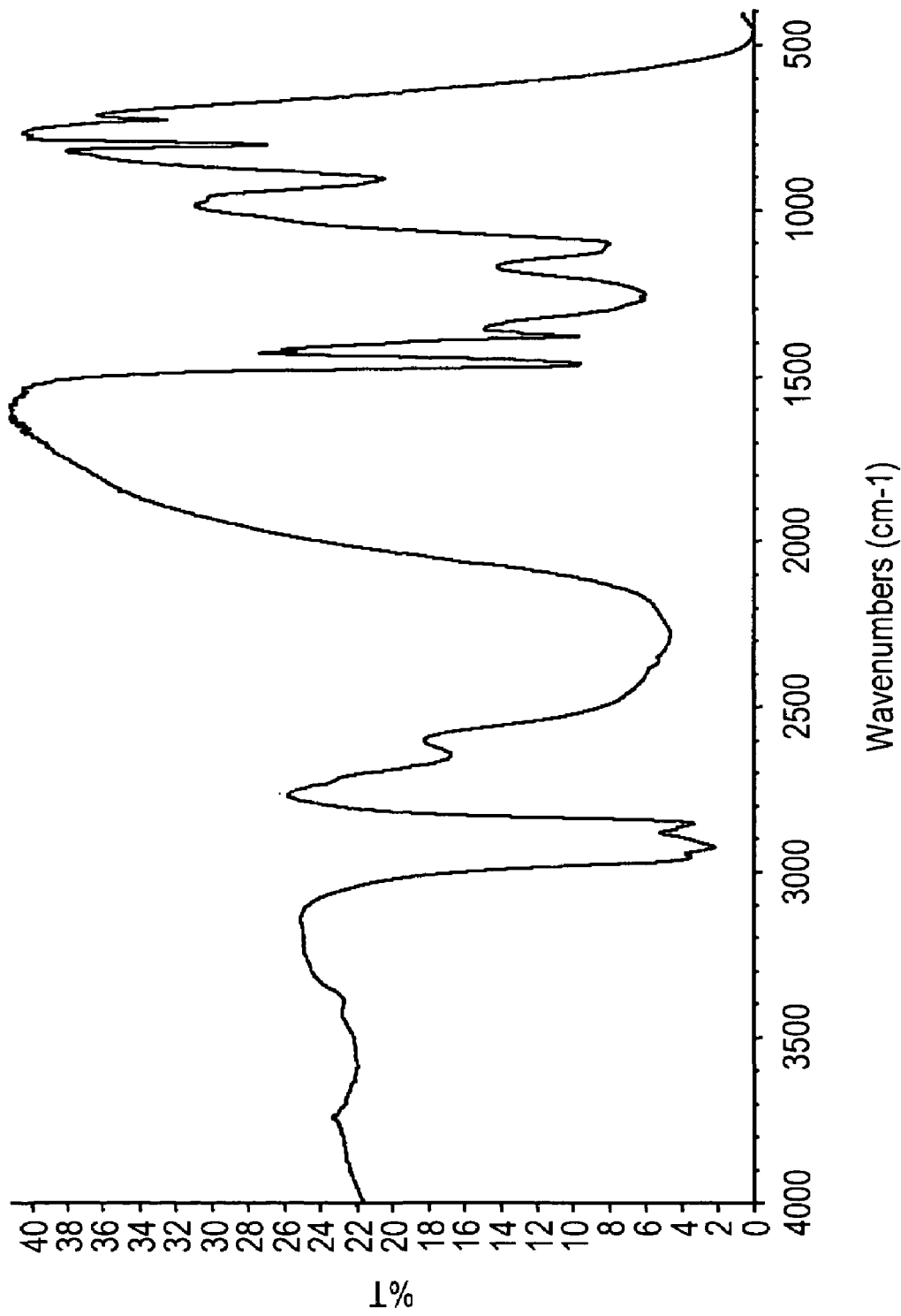
FIG. 1 is a graphical representation showing an infra-red spectrum of the product obtained by the decomposition of magnesium chloroborohydride; the product was suspended in nujol in order to obtain the infra-red spectrum.

It is to be noted that the terms "first," "second," and the like as used herein do not denote any order, quantity, or importance, but rather are used to distinguish one element from another. The terms "a" and "an" do not denote a limitation of quantity, but rather denote the presence of at least one of the referenced item. The modifier "about" used in connection with a quantity is inclusive of the stated value and has the meaning dictated by the context (e.g., includes the degree of error associated with measurement of the particular quantity). It is to be noted that all ranges disclosed within this specification are inclusive and are independently combinable.

It has been discovered that in the production of magnesium borohydrides, a reaction using a soluble metal borohydride proceeds substantially faster than a heterogeneous reaction between an insoluble metal borohydride and magnesium chloride. Disclosed herein therefore is a method for manufacturing magnesium borohydride that involves a reaction between a metal borohydride and a metal chloride composition that comprises a first metal chloride and an optional second metal chloride in a solvent wherein one or more reactants are soluble in the solvent. The reactions are conducted in such a solvent to produce thermally unstable borohydride complexes that decompose upon heating to yield magnesium borohydride.

As noted above, magnesium borohydride is produced by the reaction between a metal borohydride and magnesium chloride. Examples of suitable metal borohydrides are those wherein the metal cation is an alkali metal, an alkaline earth metal, a transition metal, or the like, or a combination comprising at least one of the foregoing metals. Examples of suitable metal borohydrides are lithium borohydride, sodium borohydride, potassium borohydride, calcium borohydride, zinc borohydride, titanium borohydrides, or the like, or a combination comprising at least one of the foregoing borohydrides.

As noted above, the first metal chloride is magnesium chloride, while the optional second metal chloride can be a chloride whose metal cation can be selected from a transition metal, an alkali metal, an alkaline earth metal, a main group metals, or the like. Examples of metal cations that can be used in the second metal chloride are zinc, titanium, iron, or the like. An exemplary second metal chloride is zinc chloride.

The molar ratio of the metal borohydrides to the sum of first metal chloride and the optional second metal chloride is about 1:1 to about 6:1 respectively. An exemplary molar ratio of the metal borohydrides to the magnesium chloride is about 2:1 to about 3:1 respectively. When a second metal chloride is used, then an exemplary molar ratio of the metal borohydride to the sum of the first metal chloride and the second metal chloride is about 1:1 to about 2:1.

As noted above, it is desirable for the solvent in which the reaction is conducted to dissolve one or more of the reactants (the metal borohydride or metal chloride composition). In an exemplary embodiment, the solvent is capable of dissolving one or more of the reactants, but does not dissolve the metal chloride formed as a result of the reaction between the metal borohydride and the magnesium chloride. It is also desirable for the solvent to not dissolve other decomposition products of unstable borohydride complexes other than the magnesium borohydride. It is also desirable for the solvent to be extractable from the solvated magnesium borohydride without promoting the decomposition of the unsolvated magnesium borohydride.

A suitable solvent for conducting the reaction is an alkyl ether. Examples of suitable alkyl ethers are methyl ether, ethyl ether, propyl ether, or the like, or a combination comprising at least one of the foregoing alkyl ethers.

The molar ratio of the solvent to the reactants is about 2:1 to about 500:1. An exemplary molar ratio of the solvent to the reactants is about 50:1 to about 100:1.

The reactants together with the solvent are subjected to agitation during the reaction. Examples of agitation can include stirring, sparging, vibrating, or the like. The reaction is generally conducted at a temperature of about 0 to about 100° C. An exemplary reaction temperature is about 20 to about 35° C.

After the reaction is completed, the solvent may be removed by evaporation to form a solid. The insoluble unreacted metal borohydride and formed metal chloride complexes may optionally be removed from the reaction mixture prior to the removal of the solvent. The insoluble metal borohydride complexes are then heated to a temperature of about 80 to about 250° C., in order to facilitate the decomposition to magnesium borohydride. The remaining solids are then separated from the magnesium borohydride solvate (if produced magnesium borohydride solvate is liquid) by separation process such as membrane separation, filtration, decantation, precipitation, centrifugation, or the like, or a combination comprising at least one of the foregoing separation processes. If the solvate is a solid, then the remaining solids are separated from the magnesium borohydride by solvent extraction. After the isolation of the magnesium borohydride solvate, the magnesium borohydride can be recovered by heating the solvate to a temperature of about 80 to about 250° C. in a vacuum of about 0.01 to about 10 Torr.

In one embodiment, if the unstable metal borohydride complexes comprise magnesium chloroborohydride, then the borohydride complex is heated at a temperature of about 180 to about 235° C. to yield magnesium borohydride. In another embodiment, if the metal borohydride complex is a zinc magnesium borohydride etherate, then heating to a temperature of about 100° C. will yield magnesium borohydride etherate.

In one exemplary embodiment, in one method of manufacturing the magnesium borohydride, lithium borohydride (LiBH$_4$) is reacted with magnesium chloride (MgCl$_2$) in a molar ratio of 2:1 to produce magnesium chloroborohydride at ambient temperature and pressure as shown in equation (I).

(I)

where Et$_2$O represents the ethyl ether solvent. The resulting magnesium chloroborohydride is then heated to a temperature of about 180° C. to about 235° C. to yield magnesium borohydride as demonstrated in equation (II). A preferred temperature for the conversion of magnesium chloroborohydride to magnesium borohydride is about 235° C.

(II)

The yield of magnesium borohydride was greater than or equal to about 80%, based on the amount of magnesium borohydride that could be theoretically obtained. Since the magnesium chloride is not soluble in the solvent, the soluble magnesium borohydride along with the solvent can be separated from the magnesium chloride as a solvate. The magnesium borohydride can then be desolvated to obtain pure magnesium borohydride.

In another exemplary embodiment, in another manner of producing the magnesium borohydride, magnesium chloride can first be reacted with zinc borohydride produced by the reaction of lithium borohydride and zinc chloride. The reaction between the magnesium chloride and the zinc borohydride forms a complex borohydride as shown in the equation (III) below:

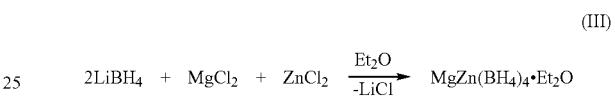

(III)

where Et$_2$O is ethyl ether. The reaction is conducted at room temperature in inert atmosphere. The complex borohydride is unstable and decomposes over 100° C. to provide magnesium borohydride as seen in reaction (IV)

(IV)

As noted above, the magnesium borohydride is soluble in the solvent, while the remaining by-products of reaction (IV) are not soluble. This facilitates the separation of the by-products by processes such as filtration, decantation, membrane separation, centrifugation, or the like. After the by-products are separated, the magnesium borohydride can be desolvated by heating the solvate in a vacuum. Reactions (III) and (IV) are fast and produce yields of greater than or equal to about 80%, based on the amount of magnesium borohydride that could be theoretically obtained.

Thus in summary, the reaction using soluble metal borohydrides proceeds much faster than the heterogeneous reaction of insoluble metal borohydrides and metal chlorides. In addition, greater yields can be obtained for reactions that use soluble metal borohydrides versus those reactions that use insoluble metal borohydrides.

The following examples, which are meant to be exemplary, not limiting, illustrate reaction as well as methods of manufacturing of some of the various embodiments of the magnesium borohydrides described herein.

EXAMPLES

Example 1

Figure 2A:
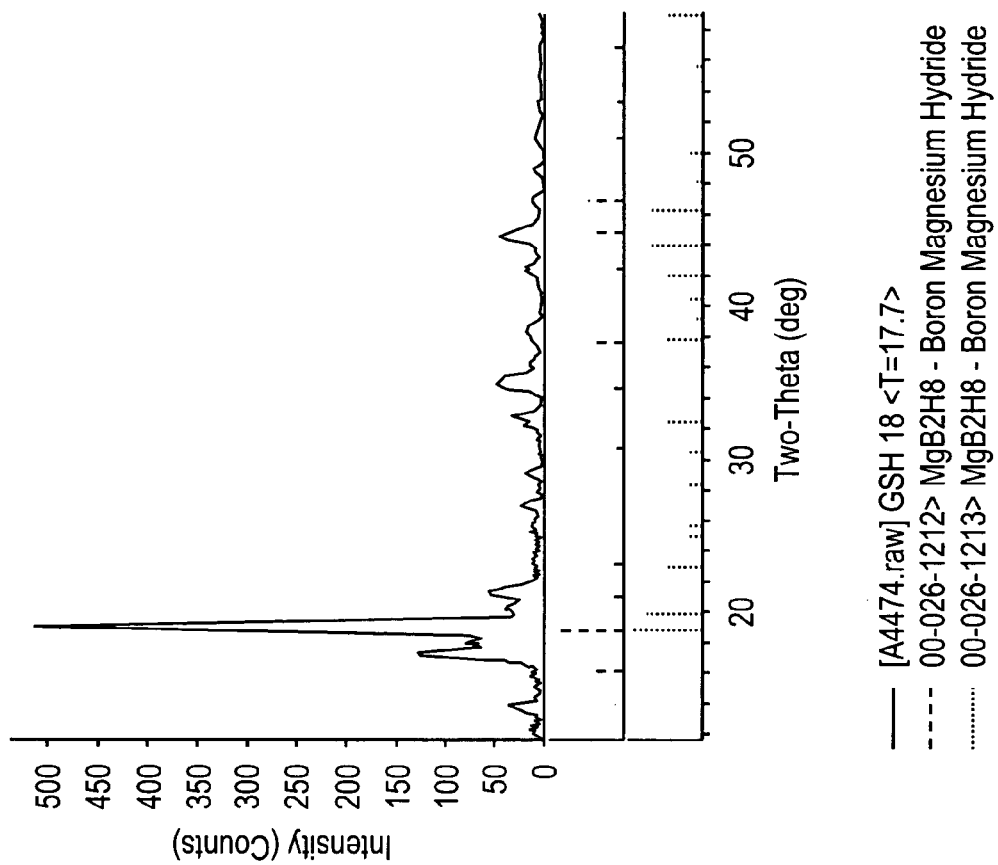
FIG. 2 is an x-ray diffraction pattern of (a) magnesium borohydride mixed with magnesium chloride obtained from Example 1 and (b) pure magnesium borohydride.
Figure 2B:
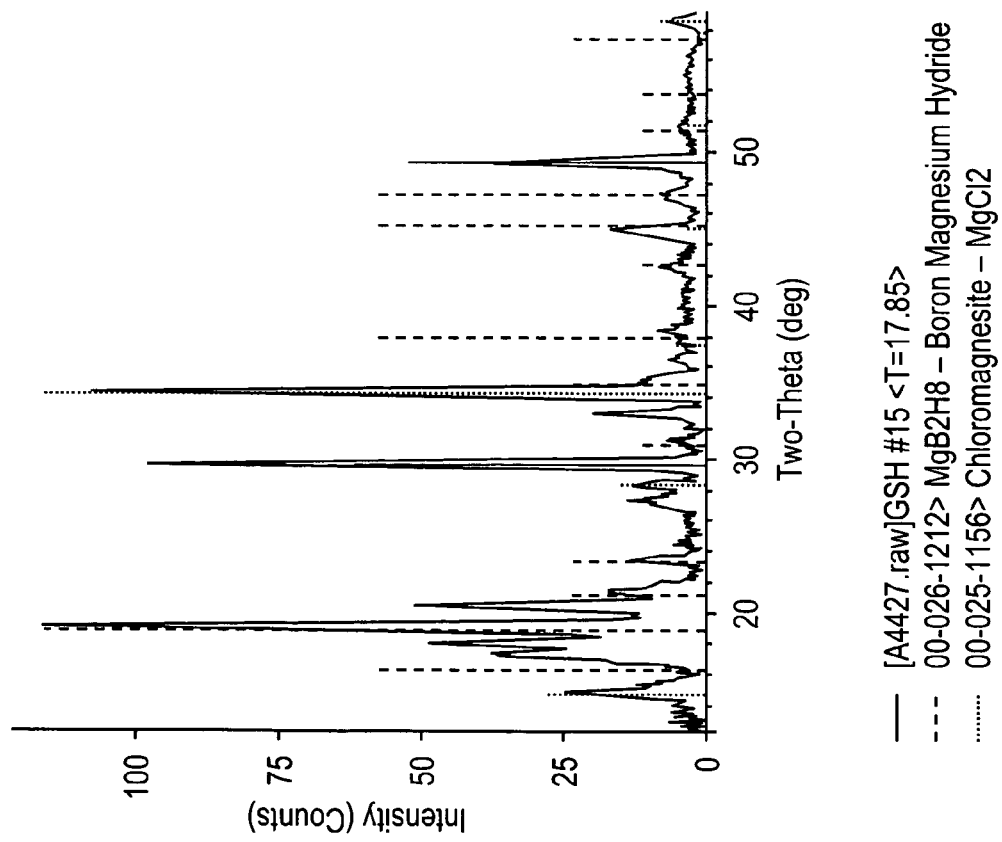

This reaction was performed to demonstrate the reaction between lithium borohydride and magnesium chloride to produce magnesium borohydride. A reaction flask was charged with 1.99 grams (g) (20.9 mmol) magnesium chloride (MgCl$_2$), 0.91 g (41.9 mmol) lithium borohydride (LiBH$_4$) and 100 mL ethyl ether (Et$_2$O). The reaction mixture was stirred overnight at room temperature and filtered through a medium glass frit. Evaporation of ether in vacuum and heating of resulting solid to 235° C. produced white solid. FIG. 1 is an infra-red (IR) spectrum showing the presence of unsolvated magnesium borohydride (Mg (BH4)$_2$). FIG. 2(a) is an X-ray diffraction (XRD) pattern showing that the white solid contains both Mg(BH4)$_2$ and MgCl$_2$, while FIG. 2(b) is an X-ray diffraction pattern of pure Mg(BH4)$_2$ prepared by heterogeneous reaction between NaBH$_4$ and MgCl$_2$ in ether.

Example 2

Figure 3:
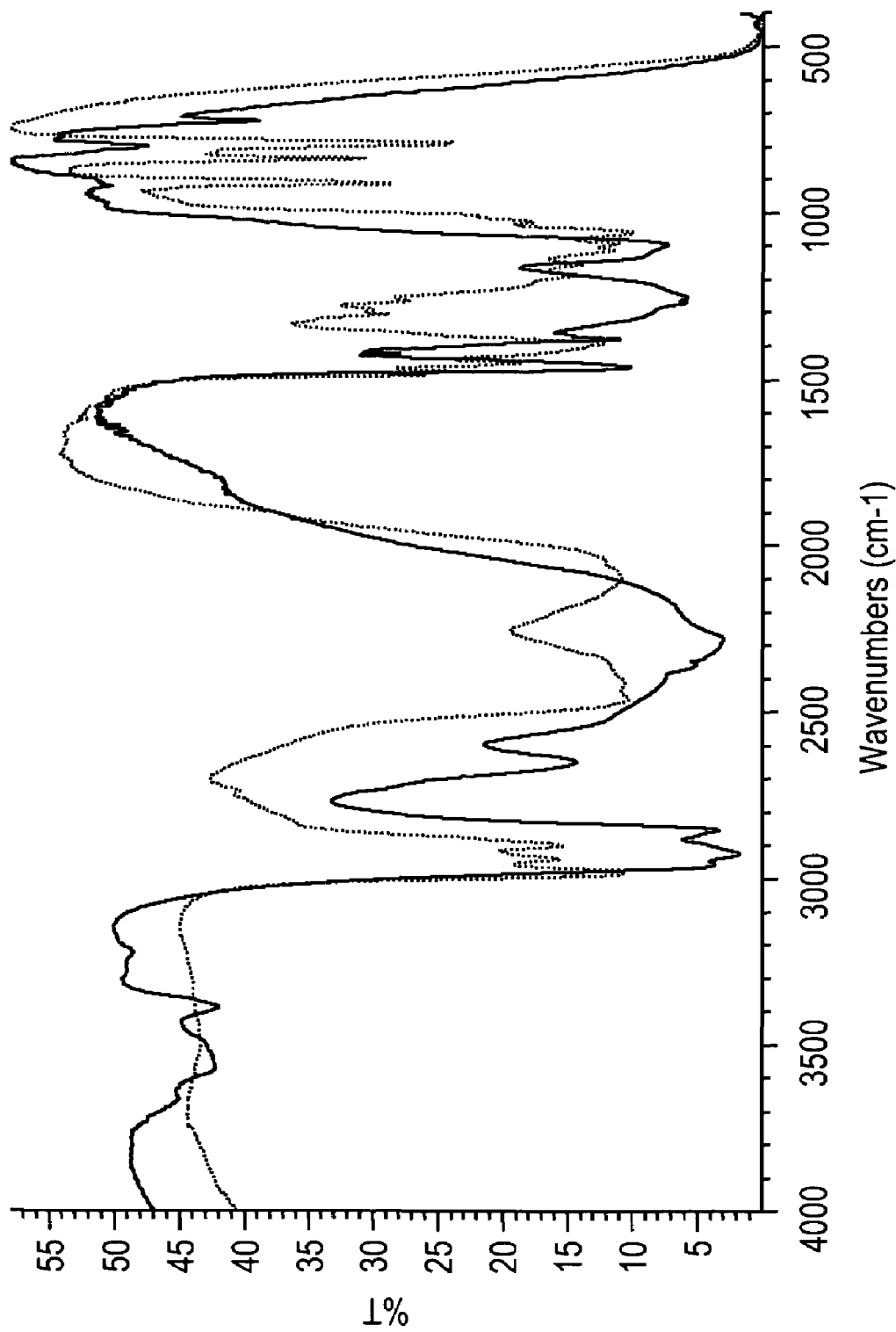
FIG. 3 is a graphical representation showing of an infra-red spectrum of magnesium borohydride etherate (solid lines) and unsolvated magnesium chloroborohydride (dotted lines) in a suspension in nujol.

This reaction was performed to demonstrate the reaction between lithium borohydride and magnesium chloride and zinc chloride to produce magnesium borohydride. A reaction flask was charged with 1.0 g (10.5 mmol) MgCl$_2$, 1.43 g (10.5 mmol) zinc chloride (ZnCl$_2$) and 0.92 g (42 mmol) LiBH$_4$ and 100 mL Et$_2$O. The reaction mixture was stirred at room temperature for 3 hours and filtered through a medium glass frit. The ether was removed by evaporation in a vacuum of 0.1 Torr. After the removal of ether, the reaction mixture was and heated to 100° C. to yield a mixture of grey solid (metal zinc) and colorless liquid (Mg(BH$_4$)$_2$.Et$_2$O). The reaction mixture can be heated from about 80 to about 120° C. The liquid was separated by filtration. Its infrared spectrum in a solution of nujol is shown in the FIG. 3 and the spectrum corresponds to magnesium borohydride etherate.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention.

What is claimed is:

1. A method comprising:
reacting a metal borohydride with a metal chloride composition that comprises magnesium chloride in a solvent to form a reaction mixture; wherein either the metal borohydride, the metal chloride composition or both the metal borohydride and the metal chloride composition are soluble in the solvent, and a formed metal chloride is insoluble in the solvent;
removing the solvent from the reaction mixture to produce a borohydride complex;
treating the borohydride complex to obtain magnesium borohydride;
extracting magnesium borohydride solvate; and
desolvating the magnesium borohydride solvate to form magnesium borohydride.

2. The method of claim 1, wherein the metal borohydride is lithium borohydride, sodium borohydride, potassium borohydride, calcium borohydride, zinc borohydride, titanium borohydride, or a combination comprising at least one of the foregoing metal borohydrides.

3. The method of claim 1, wherein a metal cation from the metal borohydride is an alkali metal, an alkaline earth metal, a transition metal, or a combination comprising at least one of the foregoing metals.

4. The method of claim 1, wherein the metal chloride composition comprises a metal chloride in addition to the magnesium chloride.

5. The method of claim 4, wherein the additional metal chloride is zinc chloride.

6. The method of claim 1, wherein a molar ratio of the metal borohydride to a sum of the magnesium chloride and a metal chloride is about 1:1 to about 6:1.

7. The method of claim 1, wherein a molar ratio of the metal borohydride to magnesium chloride is about 2:1 to about 3:1.

8. The method of claim 1, wherein a molar ratio of the metal borohydride to a sum of the magnesium chloride and a second metal chloride is about 1:1 to about 2:1.

9. The method of claim 1, wherein a molar ratio of the solvent to the sum of the metal borohydride and the metal chloride composition is about 50:1 to about 100:1.

10. The method of claim 1, wherein the solvent is an alkyl ether.

11. The method of claim 10, wherein the alkyl ether is methyl ether, ethyl ether, propyl ether, or a combination comprising at least one of the foregoing alkyl ethers.

12. The method of claim 1, wherein the solvent is removed via evaporation.

13. The method of claim 1, wherein the treating comprises heating the borohydride complex to a temperature of about 80° C. to about 250° C.

14. The method of claim 1, wherein the borohydride complex is magnesium chloroborohydride.

15. The method of claim 14, wherein the magnesium chloroborohydride is heated to a temperature of about 180° C. to about 235° C.

16. The method of claim 1, wherein the borohydride complex is zinc magnesium borohydride etherate.

17. The method of claim 16, wherein the zinc magnesium borohydride etherate is treated to a temperature of about 80° C. to about 120° C.

* * * * *